Figure 1:
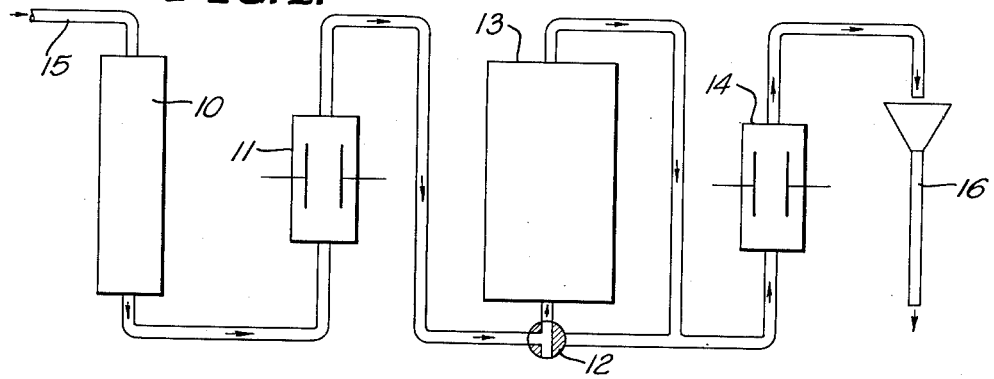

July 3, 1962 R. I. WILSON ETAL 3,042,495
METHOD AND APPARATUS FOR MEASURING DISSOLVED OXYGEN
Filed June 19, 1959 2 Sheets-Sheet 1

INVENTORS
RAY I. WILSON,
JAN HAAGEN-SMIT
BY THEIR ATTORNEYS
HARRIS, KIECH, RUSSELL & KERN

INVENTORS
RAY I. WILSON,
JAN ᵐ HAAGEN-SMIT
BY THEIR ATTORNEYS
HARRIS, KIECH, RUSSELL & KERN

United States Patent Office 3,042,495
Patented July 3, 1962

3,042,495
METHOD AND APPARATUS FOR MEASURING DISSOLVED OXYGEN
Ray I. Wilson, Covina, and Jan W. Haagen-Smit, San Gabriel, Calif., assignors to Beckman Instruments, Inc., a corporation of California
Filed June 19, 1959, Ser. No. 821,593
21 Claims. (Cl. 23—230)

This invention relates to measurement of trace amounts of dissolved oxygen in water, i.e., dissolved oxygen concentrations in the range of zero to a few hundred parts per billion. Accurate measurements in this range are of particular use in the analysis of feed water for large boilers, and in a wide variety of processes and apparatuses have been developed in the past, all of which have some undesirable features.

The Winkler method is standard for batch sample laboratory analysis of dissolved oxygen. However, this method requires skilled technicians and is time consuming and not adaptable to continuous measurements. In another method, the dissolved gases have been scrubbed from the liquid by a suitable gas such as hydrogen and the change in thermal conductivity of the scrubbing gas has provided a measure of the dissolved gas content of liquid. This type of apparatus has been unsatisfactory because of the rather slow response rate and also the fact that it is inherently nonspecific to oxygen.

Polarographic techniques are employed but provide difficulties because of drift in sensitivity of the electrodes and interferences due to the presence of substances other than oxygen. A different principle currently employed in oxygen analysis makes use of a galvanic cell wherein oxygen reacts at one electrode while the other electrode dissolves. This method requires a solution having a relatively high conductivity, ordinarily requiring pretreatment of the liquid to provide the high conductivity. Also, there is a deterioration in sensitivity due to poisoning of the electrodes.

Another method currently in use employs the chemical reaction of nitric oxide gas with the dissolved oxygen, the extent of the reaction being determined by measurement of changes in the electrolytic conductivity of the fluid resulting from ionization of nitrous acid formed by the reaction. However, the use of reacting gases creates problems in the control of the addition of the gaseous reagent. Solid reactants have also been used; however, none have previously been found satisfactory. Phosphorous would be a useable solid reactant. However, the hazards of poisoning and flammability incidental to the handling of white phosphorous make it impractical. Metallic thallium has also been used as a reactant in the measurement of dissolved oxygen in water. Thallium is a relatively active metal that, in the presence of oxygen, dissolves rapidly in water as thallous hydroxide, a highly soluble, highly ionized substance. However, thallium is very toxic and creates a considerable personnel hazard. Furthermore, a zero error is produced when thallium is used as the reactant with the water sample containing dissolved oxygen. Hence, there is an increase in conductance of the water in passing over the thallium even in the absence of dissolved oxygen.

The present invention utilizes a column of lead which is traversed by a stream of the water sample to provide a measure of the dissolved oxygen content of the water sample. The lead is without effect on the ionic content or conductivity of the water in the absence of oxygen, since lead is relatively inert and has long been used in many applications in contact with water for this very quality of inertness, for example in lead plumbing. Also, lead hydroxide is almost insoluble in water. However, it has been unexpectedly found that lead in the presence of dissolved oxygen yields metallic ions to water in contact with the lead, the increase in lead ion content being a function of the dissolved oxygen concentration of the water sample. The lead reacts with the dissolved oxygen producing lead hydroxide which in very small amounts is soluble in water, thereby altering the ionic content and the conductivity of the water sample. The invention provides a method and apparatus for determining the dissolved oxygen content of a water sample in the parts per billion range with the indicated output being linear over the range of zero to about one hundred parts per billion and only slightly nonlinear beyond this point. Furthermore, the apparatus of the invention may be used for continuous measurements of dissolved oxygen content without requiring servicing for a period of months.

It is an object of the invention to provide a method and apparatus for measuring dissolved oxygen concentration in water in the parts per billion range. A further object is to provide such a method and apparatus which may be used for continuous measurements and which is operable over a period of months without requiring adjustments, servicing or maintenance.

It is an object of the invention to provide a method of measuring trace amounts of dissolved oxygen wherein the water sample is passed over metallic lead and the change in lead ion content of the sample is determined to provide a measure of the oxygen content of the incoming sample. Another object is to provide such a method wherein the change in lead ion content and, hence, the dissolved oxygen content, is determined by measuring the change in electrical conductivity of the water sample. A further object is to provide such a method wherein the lead ion change is determined by use of colorimetric reagents which are reacted with the water sample after passing over the metallic lead, the color change of the reagent being a measure of the oxygen content.

It is an object of the invention to provide for pretreatment of the incoming water sample prior to reaction with the lead for improving the sensitivity and linearity of the measurements. A further object is to pretreat the incoming sample by ion exchange procedures to reduce the background conductivity of the sample, eliminate ambiguities in the measured output and eliminate interfering ions in the sample.

It is also an object of the invention to provide suitable apparatus for carrying out the abovementioned methods.

The invention also comprises novel details of construction and operation and novel combinations and arrangements of parts, which will more fully appear in the course of the following description. The drawings merely show and the description merely describes preferred embodiments of the present invention which are given by way of illustration or example.

Figure 2:
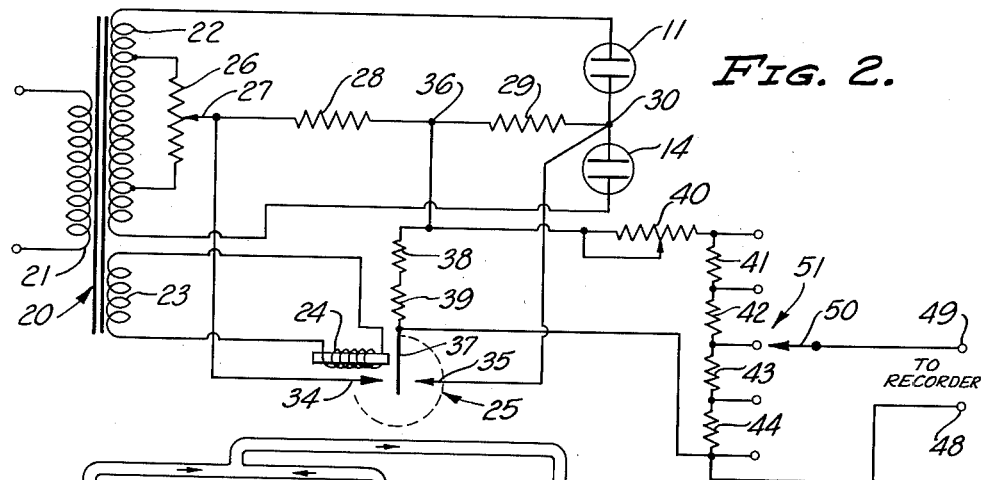
Figure 4:
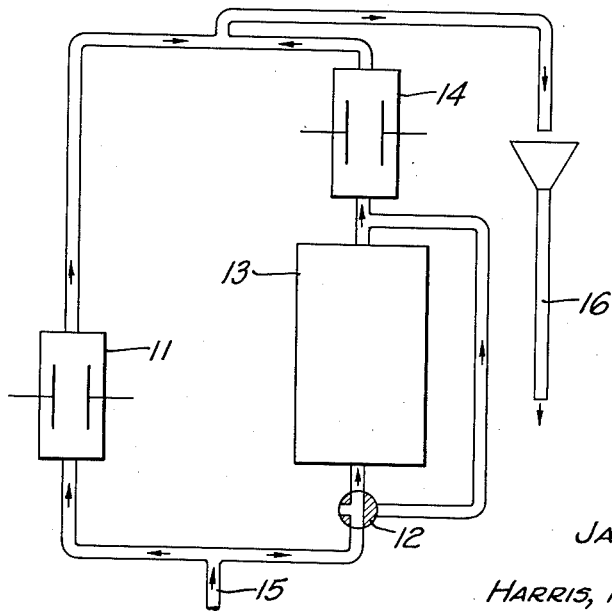
Figure 3:
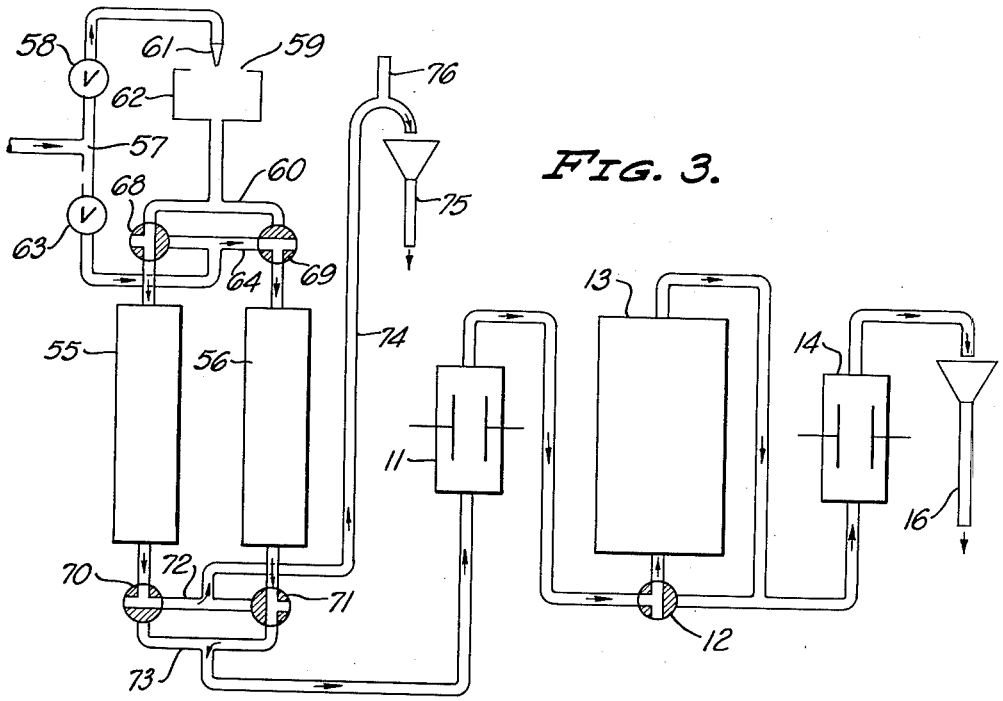
Figure 5:
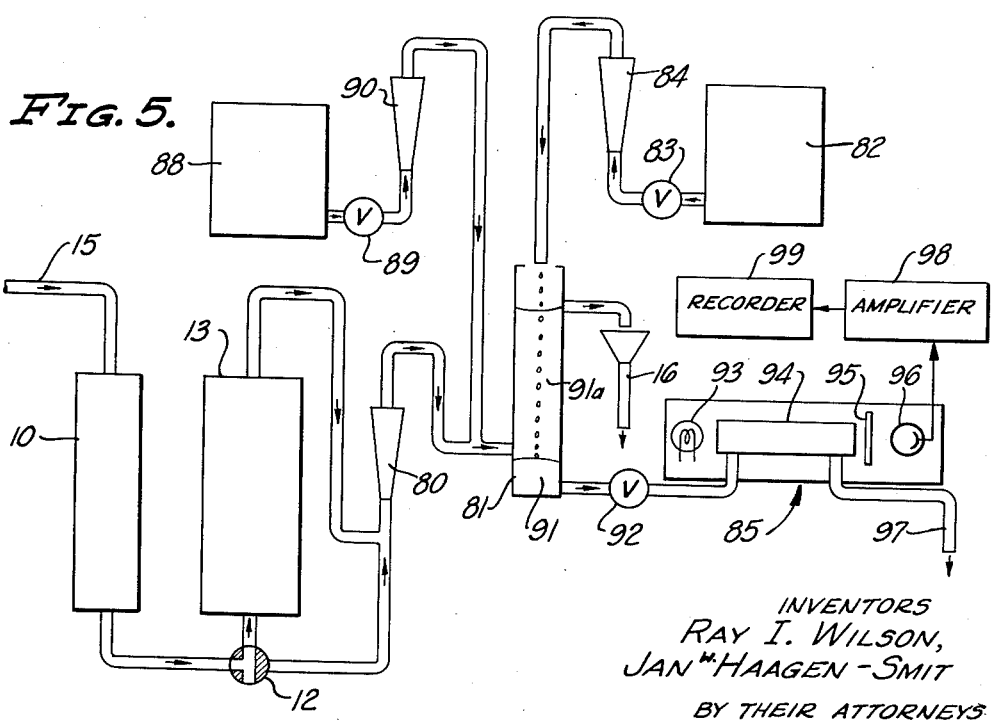

In the drawings:
FIG. 1 is a diagrammatic representation of a preferred form of apparatus for carrying out the method of the invention;
FIG. 2 is a circuit diagram of indicating apparatus suitable for use with the equipment of FIG. 1;
FIG. 3 is a diagrammatic representation of another form of the apparatus for carrying out the invention;
FIG. 4 is a diagrammatic representation of another form of the apparatus for carrying out the invention; and
FIG. 5 is a diagrammatic representation of another form of apparatus suitable for use with colorimetric reagents.

The apparatus of FIG. 1 includes an ion exchange column 10, a conductivity cell 11, a valve 12, a reaction chamber 13, a conductivity cell 14, and suitable piping for providing a flow path from an inlet 15 through the ion exchange column, the first conductivity cell, the reaction chamber, and the second conductivity cell to a drain 16. The valve 12 may be actuated to bypass the reaction chamber for calibration purposes.

The reaction chamber 13 contains metallic lead so that the stream of water sample flowing through the chamber will contact the lead for reaction of the dissolved oxygen with the lead. The dissolved oxygen in the water sample reacts substantially quantitatively with the lead, producing lead hydroxide which is soluble and substantially completely ionized in the water. In the absence of oxygen in the water sample, there is no reaction with the lead. Therefore, the increase in lead ion content of the water sample is directly proportional to the dissolved oxygen content of the sample. In the apparatus of FIG. 1, the change in lead ion content of the sample is determined by measuring the change in conductivity of the sample. This is accomplished by measuring the initial conductivity of the incoming sample in the conductivity cell 11 and the conductivity of the sample after reaction with the lead in the conductivity cell 14. The difference in readings obtained by the two cells provides a measure of the change in lead ion content and thereby the dissolved oxygen content.

It is preferred to use lead in granular form for filling the reaction chamber 13 as this provides a maximum of surface area for contacting the water sample with a minimum of volume. However, the form of the metallic lead is not essential to the practice of the invention, it merely being required that the reaction chamber provide for contact of substantially all the water sample with metallic lead. A typical instrument will have 16 ounces of granular lead of a particle size in the order of 1 mm. diameter contained in a chamber of 1 inch diameter and 6 inches long.

Maximum sensitivity and linearity are achieved in the method of the invention when the incoming water sample has a minimum conductance and is free of certain types of ions which interfere with the analysis reaction. Also, an increase in oxygen content in an acidic sample solution results in a decrease in conductivity of the solution until pH 7 is reached (due to the neutralizing effect of the lead hydroxide), after which the conductivity will increase with further increase in oxygen content. In order to avoid ambiguous readings when the change in oxygen content is determined by conductivity measurements, it is preferred to adjust the incoming water sample to pH 7 or greater so that any increase in oxygen content will produce an increase in conductivity. Therefore, the incoming water sample may be pretreated by ion exchange procedures, such as in the ion exchange column 10, prior to passing through the reaction chamber. Such pretreatment procedures will be described in detail below.

A schematic diagram of a preferred circuit for use with the apparatus of FIG. 1 is shown in FIG. 2. This circuit provides a D.C. output suitable for coupling to an indicating or recording instrument, the output being a measurement of the difference in conductivity of the two cells 11, 14. A transformer 20 has a primary winding 21 connected to an A.C. power source, a secondary winding 22 connected across the cells 11, 14 in series, and another secondary winding 23 connected to the driving coil 24 of a mechanical rectifier 25. A balancing or zero adjustment potentiometer 26 is connected across intermediate taps of the secondary winding 22. An arm 27 of the potentiometer is connected through resistors 28, 29 to a junction 30 between the cells 11, 14. The arm 27 of the potentiometer is also connected to one fixed contact 34 of the rectifier and the other fixed contact 35 is connected to the junction 30. The junction 36 between the resistors 28, 29 is connected to the moving contact 37 of the rectifier through resistors 38 and 39 and through a variable resistor 40 to a voltage divider comprising resistors 41, 42, 43, 44. The output of the circuit appears at terminals 48, 49 and is developed between the moving contact 37 of the rectifier 25 and an arm 50 of a switch 51 connected across the voltage divider circuit.

The parallel combination of the secondary winding 22 and the potentiometer 26 comprises two arms of a bridge circuit and the serially connected cells 11, 14 comprise the other two arms of the bridge circuit, the A.C. source being connected across one pair of opposing corners of the bridge and the rectifier circuit connected across the other pair of opposing corners. The resistors 28, 29 preferably have equal resistance so that equal voltages are applied to the contacts 34, 35 of the rectifier. In the preferred circuit shown herein, the resistor 38 is a thermistor which in combination with the resistors 28, 29 and 39 provides temperature compensation for the circuit. The values of these components are selected so that the circuit will have the same temperature coefficient as the temperature coefficient of conductance of a lead hydroxide solution. Specifically, in this circuit, the resistors 28 and 29 have a resistance of 20 ohms each. The resistance of the thermistor 38 is 10 ohms at 25° C. and the resistance of the resistor 39 is 2½ oms. This combination yields a temperature coefficient of resistance of approximately —1.6% per degree centigrade which is about equal in magnitude to that of a lead hydroxide solution. The variable resistor 40 provides a calibration adjustment for the output. The potentiometer arm 27 provides for adjusting the zero of the circuit by applying different voltages to compensate for differences in cell constants.

The circuit of FIG. 2 provides a D.C. output suitable for recording on a standard recording instrument, the signal being compensated for ambient or sample temperature changes (provided cells 11 and 14 are at the same temperature) and being substantially independent of the background conductance of the water sample.

We turn now to the pretreatment aspect of the invention. Where the incoming water sample is acidic and the initial conductivity is not high, the water may merely be made neutral or basic. This may be accomplished by using an ion exchange column, such as the column 10 of FIG. 1, having a mixed bed resin therein. For example, the mixed resin may use a cation resin on the sodium cycle and an anion resin on the hydroxyl cycle. Then cations in the water sample other than sodium will become attached to the resin and be replaced in the water by sodium. Anions other than hydroxyl ion are attached to the resin and replaced by hydroxyl ion in the water. Essentially neutral water may also be obtained by using resins operating on the sodium and chloride cycles instead of sodium and hydroxyl. A suitable anion resin is Rohm and Haas IRA 410. A suitable cation resin is Rohm and Haas IR 120.

A high initial conductivity of the water sample increases the background conductance and tends to reduce the accuracy of the dissolved oxygen measurement. A water sample having such high initial conductivity may be demineralized by use of a mixed bed ion exchange column operating on the hydrogen and hydroxyl cycles. The resins given as examples in the preceding paragraph may also be used for the purposes of this paragraph.

The reaction between the metallic lead and the dissolved oxygen in the water sample is subject to interference from phosphates and carbonates contained in the water sample. Therefore, where the incoming water sample contains concentrations of phosphates and/or carbonates of an amount sufficient to cause interference with the analysis, the water is pretreated to remove the interfering ions. This may be accomplished by using a mixed bed exchange resin operating on the sodium and hydroxyl cycles in the same manner as described above in connection with the conversion of an acidic sample to an alkaline sample.

Where the incoming water sample is neutral or basic but contains interfering anions such as carbonates and phosphates, the water may be treated by use of a cation exchange resin operating on the lead cycle. Since the water is not acidic, it is not necessary to use an anion resin on the hydroxyl cycle. When cations such as sodium and calcium are replaced in the solution by lead ions, the anions which could interfere are precipitated. The excess lead ions may then be removed from the solution by passage through a second cation exchanger operating on an alkali metal ion cycle, for example on a sodium cycle. In this way the use of an anion resin may be avoided in some cases, such resins sometimes proving objectionable, as discussed below. The Rohm and Haas resins identified above may be used in each of the examples given herein although, of course, other suitable resins having similar characteristics are also useable.

Of course, where the incoming water sample is neutral or basic, is free of interfering ions and has a relatively low conductance, there is no need for any type of pretreatment.

It has been found that some anion exchange resins will scavenge, i.e., react with, dissolved oxygen in the water passing through the resin, thereby producing erroneous measurements when used for pretreatment of a water sample. In carrying out the method of the invention, it is sometimes desirable to strip or remove the reducing agents from the resins to eliminate this source of error in measurement of trace amounts of dissolved oxygen. For example, where the analyzer has been operating for several days at very low oxygen concentrations, a sudden increase in dissolved oxygen concentration will not be indicated for a period of time up to an hour, the delay being due to reaction of the dissolved oxygen with the reducing agents in the exchange resins. The apparatus of FIG. 3 provides for periodical stripping of the exchange resin to remove the reducing agents, the stripping being accomplished by a portion of the incoming water sample. In this embodiment of the invention, two exchange columns 55, 56 and an array of piping and valves are substantiated for the column 10 of the apparatus of FIG. 1. The columns 55 and 56 are identical and may take any of the forms described above. The piping and valves are arranged so that while one column is being used for pretreatment of the water sample, the other column is being stripped. The incoming water sample is divided at T 57 with a portion flowing through a valve 58 and an aerator 59 to a manifold 60. The aerator provides for saturating the water with air and may consist of a spray nozzle 61 and a collecting vessel 62. The remainder of the incoming sample passes through a valve 63 to a manifold 64. Valves 68 and 69 connect the inlets of the columns 55, 56, respectively, either to the manifold 60 or the manifold 64. Similarly, valves 70, 71 connect the outlets of the columns 55, 56, respectively, either to a manifold 72 or a manifold 73. The manifold 72 is connected through a riser 74 having an outlet 76 which serves as a siphon breaker. The manifold 73 is connected to the inlet of the conductivity cell 11.

In the operation of the apparatus of FIG. 3, the valves 68 and 70 are set for directing a portion of the incoming water sample directly through the column 55 to the conductivity cell 11 and the valves 69 and 71 are set for directing the other portion of the water sample through the aerator 59 and the column 56 to the drain 75. The column 55 is then being used to pretreat the water sample which passes to the reaction chamber 13 and the column 56 is being stripped of the reducing agents which would react with the dissolved oxygen. After a suitable period of time, the valves 68, 70, 69 and 71 are reversed to interchange the flow paths so that the air saturated water flows through the column 55 and the water for pretreatment flows through the column 56.

The valves 68, 70, 69 and 71 may be operated manually or may be actuated automatically by an electrical timing mechanism to periodically change the operating cycle. The cycle of operation will ordinarily be on a 1 to 24 hour basis, depending upon the condition of the incoming sample and the characteristics of the particular exchange resins utilized. The valves 58 and 63 are used to regulate the relative flow rates through the two columns. The riser 74 and siphon breaker 76 insure that the vessel 62 of the aerator always contains some water, thus preventing trapping of air bubbles in the resin column since considerable time may be required to flush out such bubbles. Of course, a separate water source can be used for flushing or stripping the resin columns. However, it is preferred to flush with the sample water since this is readily available and does away with injection of other water into the instrument during the switching operation.

The exchange columns 55 and 56 are ordinarily in the form of cartridges that are replaceable when the resin is exhausted. However, if desired, one column could be recharged while the other is being used for pretreatment, by passing a charging solution through the column. The charging solution in this case will ordinarily contain sufficient oxygen to provide the necessary stripping of the reducing agents during the charging operation.

FIG. 4 discloses a different arrangement of the elements of the apparatus providing for parallel flow through the conductivity cells rather than series flow as shown in FIGS. 1 and 3. A portion of the incoming water sample passes directly from the inlet 15 through the cell 11 to the drain 16 and the remainder passes through the chamber 13 and the cell 14 to the drain. This arrangement is particularly useful where the background conductivity in the water sample is rapidly fluctuating. The water flow through the parallel branches may be adjusted so that the solution in the cells 11 and 14 at any given time passes through the inlet 15 at the same time. The operation of this apparatus is the same as that of the apparatus shown in FIGS. 1 and 3.

The change in lead ion content due to reaction of the water sample with the metallic lead in the reaction chamber may be determined by other processes also. For example, a colorimetric reagent may be mixed with the effluent from the lead reaction chamber and changes in the optical transmission properties of the mixture will be a function of the lead ion content of the water sample, hence an indication of the dissolved oxygen content of the incoming water sample. A suitable apparatus for performing such analysis is shown in FIG. 5, wherein components corresponding to those of FIG. 1 are identified by the same reference numerals.

The effluent from the reaction chamber 13 passes through a flow meter 80 and then through a reaction column 81 to the drain 16. Reagent from a source 82 flows through a valve 83, a flow meter 84, and the reaction column 81 to a measuring device 85. In the preferred embodiment shown herein, the reagent is dithizone (diphenyl thio carbazone) dissolved in chloroform and is introduced into the reaction column dropwise for flow counter to the water sample flow. The design of the reaction column 81 is not critical; however, the colorimetric reagent should intimately contact the water sample as each passes through the column so that the reaction will be complete. A pH buffer solution containing ammonium hydroxide and potassium chloride is admixed continuously with the water sample entering the reaction column 81 in order to stabilize the reaction against sample pH variations. The buffer solution flows from a source 88 through a throttling valve 89 and a flow meter 90 to the reaction column 81. In the column, the lower zone 91 is the chloroform phase and the upper zone 91a is the aqueous phase.

Sample water, buffer and excess dithizone extracted from the chloroform pass out the reaction column 81 to the drain 16. The reacted dithizone reagent whose optical properties have been altered by combination with the lead ion in the water sample passes to the measuring device 85 through a valve 92. This device 85 may be a colorimeter or spectrophotometer and may be calibrated to read oxygen concentration directly if desired.

A preferred form of colorimeter may include a light source 93, a fluid flow cell 94, a filter 95 and a photocell detector 96. The reacted reagent from the column 81 flows through the valve 92 and then to the cell 94 and the outlet 97. Light from the source 93 passes through the fluid in the cell 94 and the filter 95 to the photocell. The photocell detector 96 may be coupled to a conventional amplifier 98 and recorder 99 for providing a permanent record of the lead ion content of the effluent from the chamber 13 and, hence, the dissolved oxygen content of the incoming water sample.

In operating the instrument of FIG. 5, the valve 12 is first set to bypass the chamber 13 so that the zero on the recorded output can be adjusted, thereby making correction for residual reagent color. Then the valve 12 is operated to send the water sample through the chamber 13 and the recorded output provides a direct indication of the dissolved oxygen content.

A charge of granular lead weighing several ounces will suffice for operation of the instrument for several months and no other servicing is required. The apparatus of the invention is extremely simple in design and can be constructed in a compact package which is virtually insensitive to vibration, shock and orientation. While the introduction of carbonates or phosphates into the reaction chamber will interfere with the sensitivity of the measurement, this interference is not permanent and the instrument returns to normal operation soon after the interfering ions pass through the chamber. For more severe poisoning or coating of the lead, a simple rinse with nitric acid or sodium hydroxide solution will restore sensitivity. Apparatus constructed according to the invention has been operated for a month at a time with no service and no detectable zero drift or change of calibration. Furthermore, the apparatus is substantially linear in the range of zero to one hundred parts per billion of dissolved oxygen and departs only slightly from linearity at higher oxygen concentrations. The instrument may be used for measuring oxygen concentrations as high as several parts per million.

The instrument may be conveniently calibrated by passing current between electrodes positioned in the sample line ahead of the instrument. The current generates oxygen by electrolysis of the water, and the rate at which oxygen is generated may be calculated from Faraday's law. From the known rate of oxygen generation (current measurement) and a measurement of the liquid flow rate, the amount of oxygen added may be calculated with great accuracy. The oxygen added may be calculated from the following equation:

$$\text{Oxygen added, p.p.b. (wt.)} = \frac{4974 \times \text{current in milliamperes}}{\text{water flow, ml. per. min.}}$$

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a method of measuring trace amounts of dissolved oxygen in water, the steps of: passing the water sample containing dissolved oxygen over metallic lead; and measuring the change in lead ion content of the sample resulting from the contact with the lead, the quantity of dissolved oxygen in the incoming sample being proportional to the change in lead ion content.

2. In a method of measuring trace amounts of dissolved oxygen in water, the steps of: treating the water sample to have a pH of at least 7; then passing the water sample containing the dissolved oxygen over metallic lead; and measuring the increase in lead ion content of the sample resulting from contact with the lead, the quantity of dissolved oxygen in the incoming sample being proportional to the increase in lead ions.

3. In a method of measuring trace amounts of dissolved oxygen in water, the steps of: pretreating the water sample to minimize the ionic impurities thereof and convert residual ions to predetermined ionic species imparting a basic reaction to the water sample; continuously passing the water sample containing dissolved oxygen over metallic lead; and continuously measuring changes in lead ion content of the sample resulting from the contact with the lead, the quantity of dissolved oxygen in the incoming sample indicated by the measurement being proportional to the increase in lead ions.

4. In a method of measuring trace amounts of dissolved oxygen in water, the steps of: passing the water sample through cationic and anionic exchange materials so as to convert to predetermined species ions present in the water sample which are reactable with a lead hydroxide solution; passing the water sample containing dissolved oxygen over metallic lead; and measuring the increase in lead ion content of the sample resulting from contact with the lead, the quantity of dissolved oxygen in the incoming sample being proportional to the increase in lead ions.

5. In a method of measuring trace amounts of dissolved oxygen in water, the steps of: passing the water sample through cationic and anionic exchange materials operating on the hydrogen and hydroxyl cycles respectively; passing the water sample containing dissolved oxygen over metallic lead; and measuring the increase in lead ion content of the sample resulting from contact with the lead, the quantity of dissolved oxygen in the incoming sample being proportional to the increase in lead ions.

6. In a method of measuring trace amounts of dissolved oxygen in water, the steps of: passing the water sample through cationic and anionic exchange material so as to remove from the sample anions which combine with lead ions to form relatively insoluble lead salt precipitates; passing the water sample containing dissolved oxygen over metallic lead; and measuring the increase in lead ion content of the sample resulting from contact with the lead, the quantity of dissolved oxygen in the incoming sample being proportional to the increase in lead ions.

7. In a method of measuring trace amounts of dissolved oxygen in water, the steps of: passing the water sample through cationic and anionic exchange materials operating on metallic and hydroxyl cycles respectively; passing the water sample containing dissolved oxygen over metallic lead; and measuring the increase in lead ion content of the sample resulting from contact with the lead, the quantity of dissolved oxygen in the incoming sample being proportional to the increase in lead ions.

8. In a method of measuring trace amounts of dissolved oxygen in water where the incoming sample is pretreated an ion exchange column, the steps of: passing a solution containing a concentration of dissolved oxygen large compared with the trace amounts being measured, through the ion exchange column; then passing the water sample through the column to convert the ions therein to predetermined species without affecting the dissolved oxygen concentration; passing the treated water sample over metallic lead; and measuring the change in lead ion content of the sample resulting from contact with the lead, the quantity of dissolved oxygen in the incoming sample being proportional to the change in lead ion content.

9. In a method of measuring trace amounts of dissolved oxygen in water having a pH of at least 7, the steps of: passing the water sample through a cationic exchange material operating on the lead cycle; then passing the water sample through a cationic exchange material operating on an alkaline metal ion cycle; then passing the water sample over metallic lead; and measuring the increase in lead ion content of the sample resulting from contact with the lead, the quantity of dissolved oxygen in the incoming sample being proportional to the increase in lead ions.

10. In a method of measuring trace amounts of dissolved oxygen in water in the parts per million range, the water having a pH of at least 7, the steps of: passing the water sample over metallic lead in granular form to react the dissolved oxygen with the lead producing lead hydroxide; and measuring the change in lead ion content of the sample resulting from the lead hydroxide dissolving in the water, the quantity of dissolved oxygen in the incoming sample being proportional to the change in lead ion content.

11. In a method of measuring trace amounts of dissolved oxygen in water, the steps of: passing the water sample over metallic lead; and measuring the change in electrical conductance of the water sample resulting from contact with the lead, the quantity of dissolved oxygen in the incoming sample being proportional to the change in conductance thereof.

12. In a method of measuring trace amounts of dissolved oxygen in water, the steps of: measuring the conductance of the incoming water sample; passing at least a portion of the water sample over metallic lead; and measuring the conductance of the water sample after passing the lead so that the oxygen content of the sample may be determined by the change in conductance thereof.

13. In a method of measuring trace amounts of dissolved oxygen in water, the steps of: passing the water sample containing dissolved oxygen over metallic lead; then mixing a colorimetric reagent with the water sample, which reagent reacts with lead ions in the sample producing a color as a function of the lead ion concentration; and measuring the color of the reacted reagent as a measure of the dissolved oxygen content of the incoming water sample.

14. In an apparatus for measuring trace amounts of dissolved oxygen in water, the combination of: means defining a chamber having a fluid inlet and outlet; a quantity of metallic lead positioned within said chamber for contacting water passing therethrough; and means for detecting changes in the lead ion content of a water sample passing through said chamber.

15. In an apparatus for measuring trace amounts of dissolved oxygen in water, the combination of: a first conductivity cell; a second conductivity cell; means defining a chamber having a fluid inlet and outlet; a quantity of metallic lead positioned within said chamber for contacting water passing therethrough; conduit means for directing a stream of the water sample to said first cell; conduit means for directing a stream of the water sample to said chamber and then to said second cell; and circuit means for determining the difference in conductance measured by said cells as a measure of the oxygen content of the incoming water sample.

16. In an apparatus for measuring trace amounts of dissolved oxygen in water, the combination of: means defining a first reaction chamber having a fluid inlet and outlet; a quantity of metallic lead positioned within said first chamber for contacting water passing therethrough; means defining a second reaction chamber having a first fluid inlet and outlet and a second fluid inlet and outlet; first conduit means for directing a stream of water sample through said first chamber and then through said second chamber via said first inlet and outlet; a source of a colorimetric reagent; means for measuring the color of a fluid; and second conduit means for directing a stream of the reagent from said source through said second chamber via said second inlet and outlet and into said color measuring means, the color of said reagent after reaction with the water sample in said second chamber being a measure of the dissolved oxygen content of the incoming water sample.

17. In an apparatus for measuring trace amounts of dissolved oxygen in water, the combination of: means defining a first reaction chamber having a fluid inlet and outlet; a quantity of metallic lead positioned within said first chamber for contacting water passing therethrough; means defining a second reaction chamber having a first fluid inlet and outlet and a second fluid inlet and outlet; first conduit means for directing a stream of water sample through said first chamber and then to said second chamber via said first inlet and outlet; a first source of a pH buffer solution; second conduit means for connecting said first source to said first conduit means ahead of said second chamber; a second source of a colorimetric reagent comprising dithizone dissolved in chloroform; means for measuring the color of a fluid; third conduit means for directing a stream of the reagent from said second source through said second chamber via said second inlet and outlet and into said color measuring means, the color of said reagent after reaction with the water sample in said second chamber being a measure of the dissolved oxygen content of the incoming sample stream; and fourth conduit means for bypassing said first chamber and directing the incoming water sample directly to said second chamber to provide a zero calibration for the apparatus.

18. In an apparatus for measuring trace amounts of dissolved oxygen in water, the combination of: ion exchange means for converting the ions in a water sample passing therethrough to predetermined species with the effluent having a pH of at least 7; means defining a reaction chamber having a fluid inlet and outlet; a quantity of metallic lead positioned in said chamber for contacting water passing therethrough; conduit means for directing a water sample through said ion exchange means and then through said reaction chamber; and means for measuring an increase in the lead ion content of the water sample on passing through said reaction chamber.

19. In an apparatus for measuring trace amounts of dissolved oxygen in water, the combination of: first and second ion exchange means for converting the ions in a water sample passing therethrough to predetermined species with the effluent having a pH of at least 7; aerating means for adding a large quantity of air to a water sample passing therethrough; means defining a reaction chamber having a fluid inlet and outlet; a quantity of metallic lead positioned within said chamber for contacting water passing therethrough; conduit means defining a first flow path through said aerating means and through said ion exchange means in parallel to an exhaust and a second flow path through said ion exchange means in parallel and through said reaction chamber; and valve means for directing a portion of an incoming water sample along said first flow path through said first ion exchange means and a portion of the incoming sample along said second flow path through said second ion exchange means, said valve means being operable to change said flow pattern to direct a portion of the incoming sample along said first flow path through said second ion exchange means and a portion of the sample along said second flow path through said first ion exchange means; and means for measuring the increase in the lead ion content of the water sample passing through said reaction chamber.

20. In an apparatus for measuring trace amounts of dissolved oxygen in water, the combination of: a first conductivity cell; a second conductivity cell; means defining a reaction chamber having a fluid inlet and outlet; a quantity of metallic lead positioned within said chamber for contacting water passing therethrough; conduit means for directing a stream of the water sample to said first cell; conduit means for directing a stream of the water sample to said reaction chamber and then to said second cell; a bridge circuit having said first and second cells in two adjacent arms thereof; an A.C. source coupled across one pair of opposite corners of said bridge circuit; and an output circuit coupled across the other pair of opposite corners of said bridge circuit, said output circuit including a rectifier synchronized with said A.C. source for rectifying the output appearing across said other pair of corners, the rectified output being a function of the difference in conductance measured by said cells and of the dissolved oxygen content of the incoming water sample.

21. In a method of continuously measuring trace amounts of dissolved oxygen in a water stream, the steps of: passing the continuous water stream containing dissolved oxygen over metallic lead; and continuously measuring the change in lead ion content of the water stream resulting from contact with the lead, the quantity of dissolved oxygen in the incoming stream being proportional to the change in lead ion content.

References Cited in the file of this patent

UNITED STATES PATENTS

| | | |
|---|---|---|
| 2,876,189 | Spracklen | Mar. 3, 1959 |
| 2,901,327 | Thayer | Aug. 25, 1959 |

OTHER REFERENCES

MacHattie: Anal. Chem., vol. 9, pp. 364–366, 1937.

Mellor: "Comp. Treat. on Inorganic and Theo. Chem." (1927), vol. 7, pp. 561 to 568.

UNITED STATES PATENT OFFICE
CERTIFICATE OF CORRECTION

Patent No. 3,042,495                                                                   July 3, 1962

Ray I. Wilson et al.

It is hereby certified that error appears in the above numbered patent requiring correction and that the said Letters Patent should read as corrected below.

Column 4, line 19, for "oms" read -- ohms --; column 5, line 37, for "substantiated" read -- substituted --; column 6, line 71, after "out" insert -- of --; column 8, line 59, after "pretreated" insert -- in --.

Signed and sealed this 30th day of October 1962.

(SEAL)
Attest:

ERNEST W. SWIDER
Attesting Officer

DAVID L. LADD
Commissioner of Patents